Jan. 7, 1936.　　　　　K. F. SCHOEW　　　　　2,026,914
RECORDER
Original Filed Aug. 31, 1932　　2 Sheets-Sheet 1

WITNESSES

INVENTOR
Karl F. Schoew,
BY
ATTORNEY

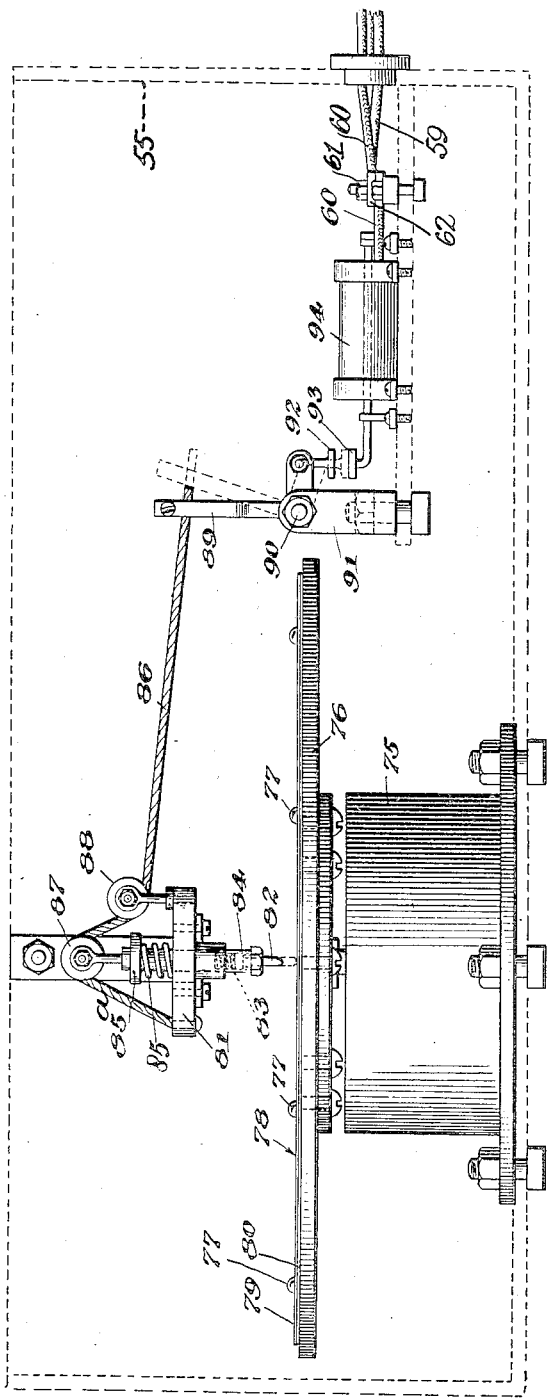

Patented Jan. 7, 1936

2,026,914

UNITED STATES PATENT OFFICE 2,026,914

RECORDER

Karl F. Schoew, Huntington, W. Va.

Original application August 31, 1932, Serial No. 631,261. Divided and this application March 8, 1934, Serial No. 714,710. Renewed November 13, 1935

3 Claims. (Cl. 234—1)

This invention relates to improvements in recorders, and its objects are as follows:—

First, to provide a recorder in which a given stylus is set in operation only when a certain condition at some remote place reaches the point at which the making of a record is to be begun.

Second, to provide a recorder in which a given stylus remains suspended from the chart until a certain condition at some remote place reaches the point at which the making of a record is to be begun, whereupon electrical means comes into play to move the stylus against said chart and keep it in contact as long as said condition lasts.

Third, to provide a record chart capable of being continuously moved, and remotely controlled means for automatically contacting at least one stylus with the chart periodically for the purpose of making a record.

Fourth, to provide a continuously movable record chart with which a plurality of styli are periodically contactible selectively by remotely controlled electrical means.

Fifth, to improve the chart by making it self-marking, so to speak, upon the application of stylus pressure.

Sixth, to provide an electro-magnetic stylus control operable by a remotely located electric hygrometer switch.

In the drawings.

Figure 2 is a side elevation of the recorder, the signal means being omitted and the casing again shown in dotted lines.

Figure 1:
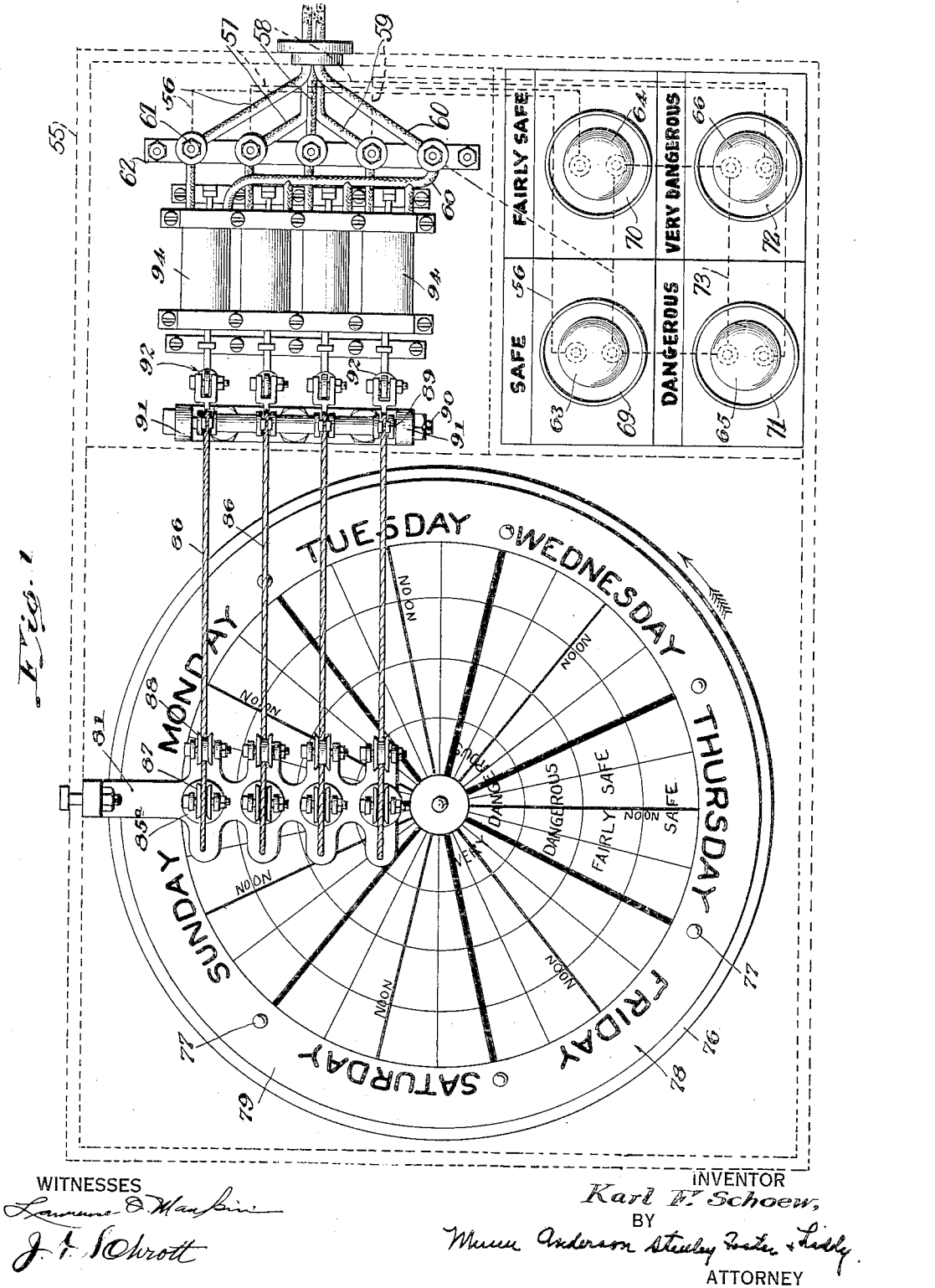
Figure 1 is a plan view of the improved recorder, the casing (such as may be used), being shown in dotted lines.

This application is a division of an application for Letters Patent for Hygrometer and electrical indicating system controlled thereby, filed by Karl F. Schoew August 31, 1932, since then eventuated in Patent 2,019,635 dated November 5, 1935, and entitled Hygrometer operated switch. The instant recorder is intended to be used in conjunction with that switch although the recorder is not confined to this particular combination.

The hygrometer operated switch (not shown) is to be regarded as located at some remote place, for example the passage of a mine. The recorder (Figs. 1 and 2) is supposed to be located at some central station where it can be investigated from time to time, not necessarily watched but looked at periodically in order to check up on the internal atmospheric conditions. It is deemed unnecessary to enlarge upon further uses of the recorder, it being sufficient to state that it is not restricted to recording atmospheric conditions in a mine.

Five wires lead into the casing 55. These are numbered 56, 57, 58, 59 and 60. 56, 57, 58, and 59 are signal wires connected with as many contacts at the remote switch and represent one side of a circuit, for instance the positive side, while the wire 60 is a common return wire. The near ends of these wires are connected to binding posts 61 on an insulating mounting 62, whence they have branches denoted by dotted lines and corresponding numerals to a signal compartment which contains signal means in the form of lamps 63, 64, 65 and 66.

These lamps are used in lieu of a certain indicator board in the parent application so that the apparatus may be under manual observation, but there may be instances in which manual observation may be suspended during off periods, and for that purpose it is desired to maintain a record of air conditions at the previously mentioned remote place. Said lamps are screwed into sockets having reflectors 69, 70, 71 and 72 respectively colored white, green, pink and red. The lamps will either be of clear or white glass, and when a particular lamp is lighted it will cause a reflection of the color of its accompanying reflector. The various lamps and reflectors are boxed off beneath the respective indicia "safe", "fairly safe", "dangerous" and "very dangerous".

The foregoing wire branches (dotted lines) 56 to 59, reading in numerical order are connected to one terminal of each of the respective lamps 63 to 66. The remaining terminals of the lamps are commonly connected as at 73, and this common connection has the return wire 60 joined to it. Assuming the current to flow in the wire 56 by virtue of a circuit closure at the remote switch (not shown), such flow will continue over the branch 56 to the lamp 63 and back by way of the common connection 73 and return wire 60. The lamp 63 will show white and denote "safe". So much for the signal means. The recorder functions simultaneously with the signal means, and makes a record simultaneously with the operation of the signal means. The construction of the recorder is as follows:—

An appropriate clockwork mechanism contained by a case 75 (Fig. 2) revolves a chart base or turntable 76 in the counter-clockwise direction at the rate of one complete revolution in seven days. The top face of the turntable has a number of pins 77 or the like by which a chart 78 is held.

The chart may either have holes agreeing with the position of the pins 77 or the pins may be made sharp so as to impale the chart. The chart is made of a layer 79 of thin transparent paper, on the underside of which is attached a sheet 80 of carbon paper having the carbon face up against the nether side of the paper 79. The paper and carbon form one piece, and when the paper 79 is pressed upon with a stylus visible marks are produced. This type of chart has the advantage of making an imprint without the necessity of changing a pencil point or replenishing a pen with ink.

A fixed holder 81 supports four styli in a radial position with reference to the center of the turntable 76, one of the styli (82) being shown in Figure 2. A light spring 83 (Fig. 2) provides for vertical play of the stylus 82 with reference to its shaft 84 in order to avoid punching the chart.

A spring 85 tends to keep the stylus 82 raised from the chart. This spring abuts the holder 81 and a collar 85ᵃ on the stylus shaft. A cord 86 is trained over sheaves 87, 88, respectively carried by the shaft 84 and by the stylus holder 81. One end of the cord is secured to the stylus holder. The other end is secured to a bell crank 89 which is pivoted at 90 to a fixed stand 91.

A turn of the bell crank 89 to the right (dotted lines, Fig. 2) will depress the sheave 87. This action moves the shaft 84 downwardly and engages the stylus 82 with the chart. The return movement of the bell crank permits the spring 85 to raise the stylus 82 from the chart. The first movement of the bell crank is produced by the following means:—

The short arm of the bell crank (Fig. 2) carries an armature 92. The armature is pivotally carried by the short arm. It is also loosely carried so as to be free to maintain a perpendicular position with reference to the extended pole 93 of an electromagnet 94. The electromagnet is electrically connected with one of the signal lamps as previously described, and the closure of the respective circuit at the remote switch will simultaneously energize the signal lamp and electromagnet 94 so as to reflect the light and render the respective stylus operative.

The immediately preceding description relates to one of the electromagnets 94. There are four of the electromagnets (Fig. 1), and the description of each, as well as its correlated parts, is identical. The electromagnet 94 and the other three are, respectively, connected to four contacts in the remote switch by means of the wires 56 to 59, and as each of the contacts is engaged by a contactor a circuit will be closed through an electromagnet and its companion lamp. The remote switch, it must be remembered, is the switch of the parent application. Consider the lamp 63. The wire 56 from one terminal of this lamp is connected to one side of the electromagnet 94 (Fig. 1). The other side of the electromagnet, in common with the return sides of all of the electromagnets, is connected with the common return wire 60. Therefore, should the remote switch indicate "safe", the engagement of the corresponding contact would result in the lighting of the lamp 63 and a depression of the outermost stylus 82 in the recorder (Fig. 1).

It will be observed that the chart (Fig. 1) is marked off in circumferential zones "safe", "fairly safe", "dangerous" and "very dangerous". There is a corresponding marking over the successive contacts of the remote switch. The outermost stylus will, therefore, make a mark in the "safe" zone. The length of the mark will denote the duration of the safe condition in the locality of the remote switch.

The operation is readily understood from the foregoing description, but the following is a brief résumé:—Located at some remote place there is supposed to be an electrical switch constructed in accordance with the parent application. This switch has a plurality of contacts which are marked "safe", "fairly safe", "dangerous" and "very dangerous". There is an element which is stretched or relaxed by the varying moisture content of the air. The stretching or relaxing is responsible for the movement of a contactor over the contacts, and as these contacts are engaged the respective one of as many circuits as there are contacts is closed.

The wires 56 to 59 lead from these contacts, the wire 60 being a common return wire. Imagine the contactor to be in engagement with the "safe" contact. It can be understood without illustration that a current flow will occur in the wire 56 from a suitable source of current, through the electromagnet 94 and through the lamp 63 back to the remote switch by way of the common return wire 60. The electromagnet and the lamp are energized simultaneously.

The effect is a pull on the cord 86, (Fig. 2) and a depression of the outermost stylus 82 from its normally suspended position above the chart 78 into contact with the continuously moving chart. The latter is continuously moved, and when the stylus contact is made a mark will appear on the chart of a length denoting the duration of the safe condition of the atmosphere in the region of the remote switch.

An identical principle obtains respecting the other electromagnets and lamps. Should a very dangerous condition occur at the remote switch the lamp 66 would shine red and the innermost stylus above the chart would be moved into contact with the chart to make a record within the "very dangerous" zone.

I claim:—

1. A recorder comprising a stylus and a fixed holder with respect to which the stylus is movable, resilient means so acting between the holder and stylus as to tend to move the stylus in one direction with respect to a chart, a cord connected with the holder and so trained with respect to the stylus as to tend to resist said resilient means, and means for pulling the cord so as to overcome the resilient means and move the stylus in the opposite direction.

2. In a recorder, electromagnetic stylus-operating means comprising an electromagnet having an extended pole piece, a bell crank and means for its pivotal support, an armature having means by which it is loosely mounted on one arm of the bell crank adjacent to the pole piece, a cord secured at one end to the second arm of the bell crank and a holder to which the other end of the cord is secured, and a stylus so supported by the holder in the way of the cord that the cord can operate the stylus when the amature is attracted by the pole piece.

3. A recorder comprising a holder, a stylus shaft slidable on the holder, a stylus mounted on one end of the shaft and a sheave mounted on the other end of the shaft, another sheave carried by the holder, a spring bearing on the holder and pushing on the shaft to slide said shaft in one direction, a cord attached at one end to the holder and so trained across the sheaves that the tension of the spring tends to pull the cord, and operable means to which the other end of the cord is attached serving when operated to pull the cord and slide the shaft in the other direction against the tension of the spring.

KARL F. SCHOEW.